(12) United States Patent
Bayer et al.

(10) Patent No.: US 6,244,625 B1
(45) Date of Patent: Jun. 12, 2001

(54) ENERGY ABSORBER FOR VEHICLES

(75) Inventors: Franz Josef Bayer, Winnenden; Hans Hofele, Steinheim; Matthias Nohr, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/514,177

(22) Filed: Feb. 28, 2000

(30) Foreign Application Priority Data

Feb. 27, 1999 (DE) .............................................. 199 08 637

(51) Int. Cl.⁷ .................................................. B60R 21/055
(52) U.S. Cl. ............................................. 280/751; 280/748
(58) Field of Search .................................. 280/748, 751, 280/752; 296/35.2, 153

(56) References Cited

U.S. PATENT DOCUMENTS 3,732,944 * 5/1973 Kendall ................................. 180/274

FOREIGN PATENT DOCUMENTS

| 836 748 | 4/1952 | (DE) . |
|---|---|---|
| 852 503 | 10/1952 | (DE) . |
| 23 51 752 | 4/1975 | (DE) . |
| 25 33 088 | 2/1977 | (DE) . |
| 28 23 299 | 12/1979 | (DE) . |
| 85 08 904 | 6/1985 | (DE) . |
| 36 42 979 | 6/1988 | (DE) . |
| 37 40 687 | 9/1988 | (DE) . |
| 38 05 869 | 11/1989 | (DE) . |
| 40 10 233 | 10/1991 | (DE) . |
| 40 30 823 | 4/1992 | (DE) . |
| 296 11 929 U | 10/1996 | (DE) . |

* cited by examiner

Primary Examiner—Paul N. Dickson
Assistant Examiner—Faye M. Fleming
(74) Attorney, Agent, or Firm—Evenson, McKeown, Edwards & Lenahan, P.L.L.C.

(57) ABSTRACT

An energy absorber having an essentially air-tight covering which surrounds a filling material and is provided with at least one feed line. In order to improve the absorption characteristics, the feed line is connected to a vacuum source and the energy absorber is coupled with a valve device as well as with a pre-crash sensor system.

14 Claims, 1 Drawing Sheet

ENERGY ABSORBER FOR VEHICLES

BACKGROUND AND SUMMARY OF THE INVENTION

The invention relates to an energy absorber in and/or on motor vehicles, having an essentially gas-tight covering which surrounds a filling material, and having at least one feed line.

A large number of energy absorbers are known from prior art. German Patent Document DE 40 10 233 A1 relates to a damping device consisting of an elastic hollow plastic body with liquid cushions and gas cushions. The damping characteristics of the devices can be varied within wide ranges by a suitable selection of the gas filling and liquid filling.

German Patent Document DE 36 42 979 A1 relates to a bumper having a support arranged transversely on the frame of a vehicle and having a plastic cover. At least one hollow body made of a thermoplastic material is arranged between the cover and the support. The hollow body is filled with gas.

From German Patent Document DE 85 08 904, a bumper is known which has a hose-shaped hollow space which can be closed in an air-tight manner. In addition, the bumper is provided with an air inlet valve through which the air-tight hollow space can be filled with compressed air.

From German Patent Document DE 852 503, a bumper for motor vehicles is known on which one or several shock absorbers are additionally arranged. The shock absorbers form closed hollow bodies which can be indirectly or directly filled with a gas or a liquid. German Patent Document DE 836 748 relates to a safety device in vehicles. The walls, the ceiling and particularly edges and protruding parts in the vehicle interior are lined by means of an air-cushion-type padding. The padding is divided into individual fields whose air-filled hollow spaces are connected with one another. The individual fields are additionally filled with sponge rubber or foam rubber or with another porous elastic material. The individual padded fields are separately or in groups connected by way of air feeding lines to a central compressed-air supply system.

German Patent Document DE 28 23 299 relates to a pneumatic safety bumper for motor vehicles with a protection of the vehicle body and of the vehicle occupants at impact speeds of up to approximately 10 km per hour by means of an elastic deformation. The pneumatic safety bumper consists of a deformable plastic material with a compressed-air filling and a safety valve.

German Patent Document DE 37 40 687 relates to an impact element for a motor vehicle with a blow-molded supporting body. At least one tube body used as an energy absorption element is arranged in the supporting body. The tube body is fixed by means of polystyrene foam balls filled into the supporting body.

A shock absorber made of an elastic material is known from German Patent Document DE 23 51 752. The shock absorber can be filled with compressed air.

German Patent Document DE 25 33 088 relates to a device for dissipating impact energy by means of grinding bodies made of a brittle material which, in the event of an impact, rub against one another and at least partially disintegrate to fragments.

From German Patent Document DE 296 11 929 U1, a shock absorber is known for protecting the human body, which consists of a foil bag which is at least partially filled with elastic filling bodies, is hermetically closed on all sides and is provided with a valve for the evacuation and ventilation. The shock absorber provides a protective body which is adapted to the respectively assigned human body region and which is accommodated by a correspondingly designed sports-type protector.

It is an object of the invention to provide, in the case of a motor vehicle, according to the situation, an energy absorber with improved absorption characteristics. Furthermore, the energy absorber should have varied uses.

This object is achieved according to the invention by providing an energy absorber padding for motor vehicles, having an essentially gas-tight covering which surrounds a filling material and is provided with at least one feed line, wherein the feed line is connected to a vacuum source, the energy absorber being coupled with a valve device which provides that the interior of the covering is acted upon either by a vacuum or by ambient pressure, and the energy absorber being coupled with a pre-crash sensor system.

By applying a vacuum, a hard energy absorber is provided which has good absorption characteristics. Simultaneously, it is ensured as the result of the vacuum that the covering of the energy absorber which, as a rule, is flexible, retains its shape also in the event of a shock-type stress. Uses as foam replacements in the inside and outside area of the vehicle are also conatemplated. Thus, a use of the energy absorber according to the invention is conceivable in bumpers, as knee pads or as padding in the door area/column area.

The valve device coupled with the energy absorber provides that the interior of the covering is acted upon either by means of a vacuum or by means of ambient pressure. In the normal condition, the interior of the covering is acted upon by ambient pressure. This has the result that the energy absorber feels relatively soft and comfortable. In critical situations, the interior of the covering is acted upon by a vacuum. As the result, the filling material is compressed and the covering is placed tightly against the filling material. The energy absorber hardens as a whole. If a critical situation does not result in an impact onto the energy absorber or the impact does not result in an irreversible change of the energy absorber, ambient pressure can again be admitted to the interior of the covering. A triggering of the energy absorber therefore does not necessarily have the effect that it becomes useless and must be exchanged.

As the result of the pre-crash sensor system, it is achieved that the interior of the covering is acted upon by a vacuum only in pre-crash situations. In this case, it is possible to use a pre-crash sensor system already present in the vehicle. The energy absorber according to the invention can therefore be integrated in existing vehicles without major expenditures.

A special embodiment of the invention is characterized in that the filling material is non-deformable. A particle-shaped bulk, such as sand, can be used as the filling material. The incompressible grains of sand have the result that the energy absorber operates in a reversible manner as long as the covering is not damaged.

Another special embodiment of the invention is characterized in that the filling material is deformable. A material (such as hollow balls) which is jelly-like in the soft state, as the filling material, will collapse in itself in the event of a shock-type stress and therefore provides a deformation path. This has the result that the energy absorber operates in an irreversible manner and must therefore be exchanged after a shock-type stress.

Other objects, advantages and novel features of the present invention will become apparent from the following detailed description of the invention when considered in conjunction with the accompanying drawings.

DETAILED DESCRIPTION OF THE DRAWINGS

Figure 1:
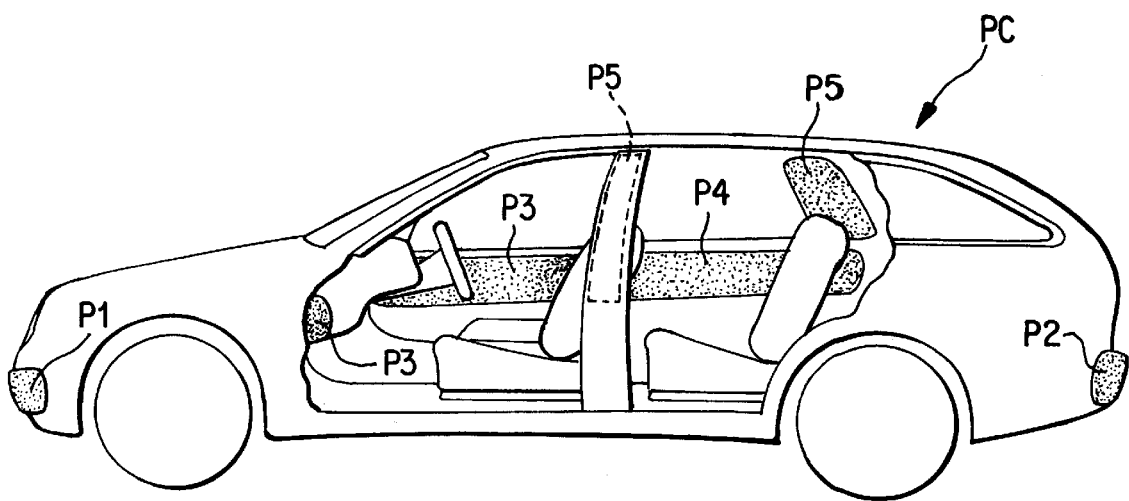
FIG. 1 is a schematic sectional view of a passenger car with energy absorbing padding constructed according to preferred embodiments of the invention.

FIG. 1 schematically depicts a passenger car PC with padding structures that can be constructed according to preferred embodiments of the present invention. These padding structures may include one or more of bumpers P1 And P2, knee padding P3, door area padding P4 and column area padding P%. Details of the padding structure and system is described below with reference to FIGS. 2 and 3, where the padding is depicted by the reference character P.

Figure 2:
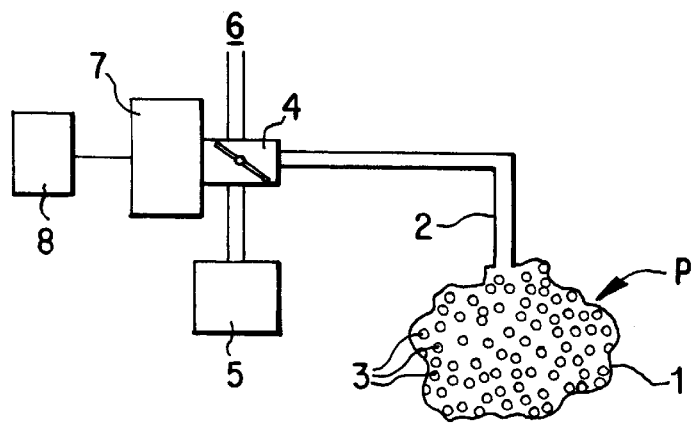
FIG. 2 is a schematic sectional representation of an energy absorber padding according to the invention shown in a normal condition, without vacuum applied.

The energy absorber illustrated in a cross-sectional view in FIG. 2 comprises a flexible gas-tight covering 1. The flexible covering 1 surrounds a plurality of particles 3 of a filling material. By way of a feed line 2, the interior of the covering 1 can be selectively connected with a vacuum source 5 and atmosphere 6 utilizing a valve 4 controlled by control unit 7. The control unit 7 is operable in response to crash or precrash signals from sensor 8.

Figure 3:
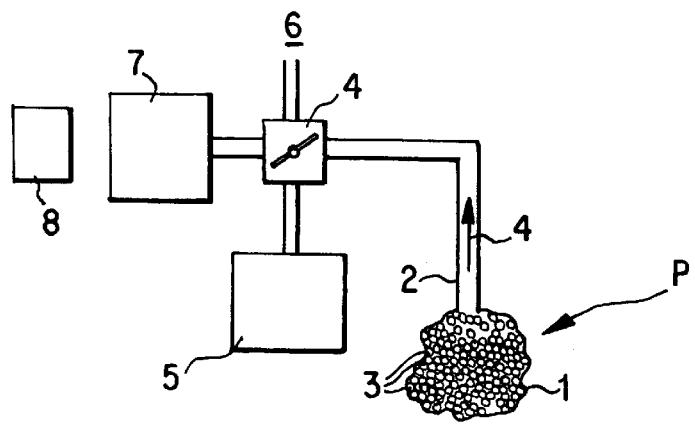
FIG. 3 is a view of the energy absorber padding of FIG. 2 in a condition acted upon by a vacuum.

In FIG. 3, it is indicated by means of an arrow 4 that the interior of the covering 1 is acted upon by a vacuum. As illustrated, in contrast to the position shown in FIG. 1, the covering 1 has contracted around the filling material particles. The individual filling material particles 3 are situated tightly against one another. As a result, a compacting of the energy absorber is achieved.

The invention creates a switchable energy absorber on the basis of the vacuum principle. The covering 1 is closed on all sides and may also be provided with several feed lines. According to the conditions detected by sensor 8, either a vacuum from vacuum generator or suction device 5 is applied to the largely air-tight covering 1, or the feeding of air or another medium (e.g., local atmosphere 6) is permitted.

The covering is filled with a medium 3 which, in the widest sense, has either a sand-type or a jelly-type behavior. The filling material may consist of a quasi ball-shaped material or of a hollow-ball-shaped material. The operation is independent of the geometrical shape of the filling material. In general, a differentiation can be made between two types of filling material. On the one hand, filling material particles can be used which themselves hardly permit any inherent deformation, such as sand. On the other hand, filling material particles can be used which collapse in themselves and therefore provide a deformation path such as hollow ball shaped elastic material particles. In this manner, reversible and irreversible absorbers can be implemented.

The application possibilities for the padding include: (i) foam replacement in the bumper (padding P1, P2), (ii) knee padding P3, (iii) padding P4 in the door area and (iv) padding P5 in the column area. All applications have in common that more or less energy is dissipated when loaded by pressure collision forces depending on whether the condition of FIG. 2 or of FIG. 3 is present.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Energy absorber padding for motor vehicles, having an essentially gas-tight covering which surrounds a filling material and is provided with at least one feed line, wherein the feed line is connected to a vacuum source, the energy absorber being coupled with a valve device which provides that the interior of the covering is acted upon either by a vacuum or by ambient pressure, and the energy absorber being coupled with a pre-crash sensor system.

2. Energy absorber according to claim 1, wherein the filling material is non-deformable.

3. Energy absorber according to claim 1, wherein the filling material is deformable.

4. A passenger vehicle padding system including:

a padding assembly having filling material enclosed by an essentially gas-tight cover, a feed line opening to the filling material through said cover, and a fluid supply controller operable to selectively communicate the feed line and filling material with a vacuum source and an ambient pressure source to, thereto, change the energy absorbing characteristics of the padding assembly.

5. A system according to claim 4, wherein the padding assembly forms a knee pad in a vehicle passenger space.

6. A system according to claim 4, wherein the padding assembly forms a vehicle bumper component.

7. A system according to claim 4, wherein the padding assembly forms a vehicle door interior padding having a vehicle passenger space.

8. A system according to claim 4, wherein the padding assembly forms a vehicle column padding facing a vehicle passenger space.

9. A system according to claim 4, wherein said fluid supply controller includes a valve controlled in response to a vehicle crash or precrash sensing signal which operates to communicate the padding assembly with local ambient atmosphere during normal vehicle operating conditions and to communicate the padding assembly with the vacuum source under vehicle crash conditions.

10. According to claim 4, wherein the filling material is composed of non-deformable particles.

11. According to claim 4, wherein the filling material is composed of elastically deformable particles.

12. A method of controlling deformation characteristics of vehicle padding assemblies, said method comprising:

providing an essentially gas-tight covering surrounding a filling material;

communicating the filling material with ambient atmosphere during normal vehicle operation and communicating the filling material with a vacuum during vehicle crash conditions.

13. A method according to claim 12, wherein the filling material is composed of non-deformable particles.

14. A method according to claim 12, wherein the filling material is composed of elastically deformable particles.

\* \* \* \* \*